(12) United States Patent
Zhang et al.

(10) Patent No.: US 11,162,847 B2
(45) Date of Patent: Nov. 2, 2021

(54) METHOD AND SYSTEM OF ATTITUDE ESTIMATION OF SPOTTED TARGET

(71) Applicant: Huazhong University of Science and Technology, Wuhan (CN)

(72) Inventors: Tianxu Zhang, Wuhan (CN); Fenglin Wang, Wuhan (CN); Shoukui Yao, Wuhan (CN); Lei Lu, Wuhan (CN); Xu Cheng, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 351 days.

(21) Appl. No.: 16/458,221

(22) Filed: Jul. 1, 2019

(65) Prior Publication Data

US 2019/0323894 A1  Oct. 24, 2019

Related U.S. Application Data

(63) Continuation-in-part of application No. PCT/CN2017/077101, filed on Mar. 17, 2017.

(30) Foreign Application Priority Data

Dec. 31, 2016 (CN) .......................... 201611268809.8

(51) Int. Cl.
*G01J 5/00* (2006.01)
*G06N 20/00* (2019.01)

(52) U.S. Cl.
CPC ............ *G01J 5/0022* (2013.01); *G06N 20/00* (2019.01); *G01J 2005/0077* (2013.01); *G01J 2005/0081* (2013.01)

(58) Field of Classification Search
None
See application file for complete search history.

(56) References Cited

U.S. PATENT DOCUMENTS

| 2013/0135470 A1* | 5/2013 | Prata ...................... H04N 5/247 348/144 |
| 2016/0347482 A1* | 12/2016 | Dimpfl ..................... B64G 3/00 |

* cited by examiner

*Primary Examiner* — Hugh Maupin
(74) *Attorney, Agent, or Firm* — JCIPRNET

(57) ABSTRACT

A method of attitude estimation of a spotted target. The method includes an offline training and an online estimation. The offline training includes establishing a three-dimensional geometric model of a target, performing region division according to the structure of the target, establishing an object-space temperature distribution model for each region of the target, establishing an infrared radiation transmission model of an intra-atmospheric target in six attitudes in observation by a detection system, constructing an image-space radiant energy model of the target in the six attitudes using the object-space temperature distribution model and the infrared radiation transmission model, and performing simulation calculation to obtain an infrared spectral curve of the spotted target regarding wavelength versus image-space-radiant-energy-of-target, so as to establish a mapping database regarding target-attitude versus spectrum.

9 Claims, 7 Drawing Sheets

METHOD AND SYSTEM OF ATTITUDE ESTIMATION OF SPOTTED TARGET

CROSS-REFERENCE TO RELATED APPLICATIONS

This application is a continuation-in-part of International Patent Application No. PCT/CN2017/077101 with an international filing date of Mar. 17, 2017, designating the United States, now pending, and further claims foreign priority benefits to Chinese Patent Application No. 201611268809.8 filed Dec. 31, 2016. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to a method and system of attitude estimation of a spotted target.

Attitude estimation of a three-dimensional target is a hot research topic in the field of computer vision, and it has been extensively studied in fields such as face recognition, operation and control of aircrafts, etc.

Existing methods for measuring attitudes of a spatial target include tracking and recording videos, analyzing target information in time sequences, and estimating three-dimensional attitude parameters. These methods are costly, and most of them focus on the estimation of shape information of an area target. They also fail to estimate attitudes of a spotted target.

SUMMARY

The disclosure provides a method of attitude estimation of a spotted target. The method comprises establishing a characteristic database with regard to spectra and attitudes, analyzing radiation characteristics of various components of a target in different attitudes, and then, based on forms and shapes of measured infrared spectra, estimating the attitude of the spotted target.

Disclosed is a method of attitude estimation of a spotted target, the method comprising: an offline training and an online estimation.

The offline training comprises:

(1) establishing a three-dimensional geometric model of a target, and performing region division according to the structure of the target;

(2) establishing an object-space temperature distribution model for each region of the target;

(3) establishing an infrared radiation transmission model of an intra-atmospheric target in six attitudes in observation by a detection system, the six attitudes comprising "bottom-view", "top-view", "head-on", "tail-chase", "left-right", and "side";

(4) constructing an image-space radiant energy model of the target in the six attitudes using the Object-space temperature distribution model and the infrared radiation transmission model; and (5) in the six attitudes, based on the image-space radiant energy model of the target, performing simulation calculation to obtain an infrared spectral curve of the spotted target regarding wavelength versus image-space-radiant-energy-of-target, so as to establish a mapping database regarding target-attitude versus spectrum.

The online estimation comprises:

(6) detecting the spotted target;

(7) acquiring the image-space radiant energy of the spotted target in real-time, and plotting an infrared spectral curve of the spotted target regarding wavelength versus image-space-radiant-energy-of-target; and (8) matching the infrared spectral curve of the spotted target regarding wavelength versus image-space-radiant-energy-of-target, obtained in (7), within the mapping database regarding target-attitude versus spectrum, to determine the attitude of the target.

(4) can comprise:

(4.1) based on the object-space temperature distribution model, constructing an expression $L(T_{(x,y,z)})$ for the object-space radiation characteristic of the target:

in a waveband $\lambda_1 \sim \lambda_2$ and at a temperature T, an equivalent blackbody radiance $L_b(T_{(x,y,z)})$ is:

$$L_b(T_{(x,y,z)}) = \int_{\lambda_2}^{\lambda_1} \frac{1.1910 \times 10^8}{\lambda^5} \cdot \frac{1}{e^{\frac{14388}{\lambda T_{(x,y,z)}}} - 1} d\lambda$$

hence, the infrared radiance $L(T_{(x,y,z)})$ of a surface of the target is:

$$L(T_{(x,y,z)}) = \bar{\varepsilon} \cdot L_b(T_{(x,y,z)}),$$

in the above formula, $\lambda$ represents wavelength, $T_{(x,y,z)}$ represents an object-space temperature of a target at a position (x,y,z), blackbody emissivity is $\varepsilon = 1$, and $\bar{\varepsilon}$ represents infrared emissivity of a material on a surface of the target;

(4.2) Based on the expression for the object-space radiation characteristic of the target and with atmospheric influence taken into account, constructing an expression for the image-space radiation characteristic of the target as below:

$$L(T_{(x,y,z)}) = \bar{\varepsilon} \cdot L_b(T_{(x,y,z)}) \cdot \rho_\theta + L_\theta$$

where, $\rho_\theta$ represents transmittance, $L_\theta$ represents atmospheric path radiation.

The target can be an aircraft, and radiance of the aircraft is mainly divided into three parts to be calculated respectively: aircraft skin, engine, and exhaust plume.

When calculating the radiance of the aircraft skin, first, the object-space temperature $T_{(x,y,z)}$ of the target at a position (x,y,z) is processed, to obtain an object-space temperature of the target with a speed taken into account:

$$T_{2(x,y,z)} = T_{(x,y,z)} g\left(1 + k\frac{\gamma - 1}{2} M^2\right)$$

where, k represents a coefficient of restitution, $\gamma$ represents a ratio of constant pressure heat capacity to constant volume heat capacity of air, and M represents a speed.

(8) can comprise: based on the infrared spectral curve of the spotted target regarding wavelength versus image-space-radiant-energy-of-target obtained in (7), preliminarily determining the attitude of the aircraft and extracting a set of spectral curves corresponding to the attitude, from the mapping database; then, performing accurate match in the set of spectral curves, to determine the attitude of the target.

The target is an aircraft, and the infrared spectral curve of the spotted target regarding wavelength versus image-space-radiant-energy-of-target obtained in (7) is analyzed as follows:

if long-wave infrared radiation is dominant, then preliminarily determining the attitude as "head-on";

if all of short/medium/long-wave radiation is present, then preliminarily determining the attitude as "side";

if all of short/medium/long-wave radiation is present, and long-wave infrared radiation is strongest, then preliminarily determining the attitude as "top-view" or "bottom-view";

if short/medium-wave radiation is strongest, and long-wave radiation is weakest, then preliminarily determining the attitude as "tail-chase".

A system of attitude estimation of a spotted target, comprises: an offline training part and an online estimation part;

The offline training part comprises:

a three-dimensional-model establishing module, which is adapted to establish a three-dimensional geometric model of the target, and perform region division according to the structure of the target;

an object-space-temperature-distribution-model establishing module, which is adapted to establish an object-space temperature distribution model for each region of the target;

an infrared-radiation-transmission-model establishing module, which is adapted to establish an infrared radiation transmission model of an intra-atmospheric target in six attitudes in observation by a detection system; the six attitudes comprise "bottom-view", "top-view", "head-on", "tail-chase", "left-right", and "side";

an image-space-radiant-energy-model establishing module, which is adapted to use the object-space temperature distribution model and the infrared radiation transmission model to construct an image-space radiant energy model of the target in the six attitudes; and a mapping-database establishing module, which is adapted to, in the six attitudes, based on the image-space radiant energy model of the target perform simulation calculation to obtain an infrared spectral curve of the spotted target regarding wavelength versus image-space-radiant-energy-of-target so as to establish a mapping database regarding target-attitude versus spectrum.

The online estimation part comprises:

a detection module which is adapted to detect a spotted target;

an infrared-spectral-curve-of-spot-shaped-target generation module, which is adapted to acquire the image-space radiant energy of the spotted target in real-time and plot an infrared spectral curve of the spotted target regarding wavelength versus image-space-radiant-energy-of-target; and an attitude estimation module, which is adapted to match the generated infrared spectral curve of the spotted target regarding wavelength versus image-space-radiant-energy-of-target, within the mapping database regarding target-attitude versus spectrum, to determine the attitude of the target.

The image-space-radiant-energy-model establishing module comprises:

An expression-for-object-space-radiation-characteristic-of-target constructing submodule, which is adapted to, based on the object-space temperature distribution model, construct an expression $L(T_{(x,y,z)})$ for the object-space radiation characteristic of the target:

in a waveband $\lambda_1 \sim \lambda_2$ and at a temperature T, an equivalent blackbody radiance $L_b(T_{(x,y,z)})$ is:

$$L_b(T_{(x,y,z)}) = \int_{\lambda_2}^{\lambda_1} \frac{1.1910 \times 10^8}{\lambda^5} \cdot \frac{1}{e^{\frac{14388}{\lambda T_{(x,y,z)}}} - 1} d\lambda$$

hence, the infrared radiance $L(T_{(x,y,z)})$ of a surface of the target is:

$$L(T_{(x,y,z)}) = \bar{\varepsilon} \cdot L_b(T_{(x,y,z)}),$$

where, $\lambda$ represents wavelength, $T_{(x,y,z)}$ represents an object-space temperature of a target at a position (x, y, z), blackbody emissivity is $\varepsilon=1$, and $\bar{\varepsilon}$ represents infrared emissivity of a material on a surface of the target;

an expression-for-the-image-space-radiation-characteristic-of-target constructing submodule, which is adapted to, based on the expression for the object-space radiation characteristic of the target, and with atmospheric influence taken into account, construct an expression for the image-space radiation characteristic of the target as below:

$$L(T_{(x,y,z)}) = \bar{\varepsilon} \cdot L_b(T_{(x,y,z)}) \cdot \rho_\theta + L_\theta$$

where, $\rho^\theta$ represents transmittance, $L_\theta$ represents atmospheric path radiation.

The attitude estimation module can comprise:

a preliminary determination submodule, which is adapted to, based on the generated infrared spectral curve of the spotted target regarding wavelength versus image-space-radiant-energy-of-target, preliminarily determine the attitude of an aircraft, and extract a set of spectral curves corresponding to the attitude, from the mapping database; and an accurate match submodule, which is adapted to perform accurate match in the set of spectral curves, to determine the attitude of the target.

Advantages of the disclosure are summarized as follows:

(1) Attitudes of a target are divided into "head-on", "tail-chase", "bottom-view", "top-view", "left-right" and "side", and a spectral database corresponding to the six attitudes is established. The target is three-dimensional in spatial distribution, and a variety of attitude information of the target can be reflected under different observation angles.

(2) The attitudes of a target are related to shapes of observed spectral curves. Infrared radiation spectrum of a target is mainly determined by temperature, while materials, structures and compositions of the target itself have an influence on the temperature at each point of the surface of the target. That is, according to the structures, the target can be divided into several different regions of temperature, and the target's regions observed in different attitudes of the target are also different, therefore spectral curves of the observed spotted target are also different.

(3) Forms and shapes of infrared spectra of a three-dimensional target are utilized to estimate a current attitude of the target. By analyzing and comparing information on differences of radiant energy values in respective wavebands of infrared spectrum of a measured spotted target, and through combination with temperature distribution, formed depending on the structure of the target, and spectral characteristics in the six attitudes, a current attitude of the measured spotted target is estimated.

The disclosure contemplates a target's temperature distribution and radiation characteristics, both varying with many factors such as spatial position, attitude, and detection distance, etc.; also, attitudes of a target are effectively distinguished, in a manner that is simple, proper and highly accurate, thereby solving the problem of how to estimate an attitude of a spotted target based on infrared spectral information.

DETAILED DESCRIPTION OF THE PREFERRED EMBODIMENTS

To further illustrate, embodiments detailing a method and system of attitude estimation of a spotted target are described below. It should be noted that the following embodiments are intended to describe and not to limit the disclosure.

A method of attitude estimation of a spotted target comprises an offline training and an online estimation. The offline training comprises: establishing a three-dimensional geometric model, a temperature distribution model and an atmospheric transmission model of a target; setting simulation parameters, performing simulation calculation of infrared radiation spectra of a spotted target in six attitudes, and establishing an "attitude-spectrum" database; the online estimation comprises: analyzing forms and shapes of measured infrared spectra, and comparing with the "attitude-spectrum" database, to estimate a current attitude of the target.

Figure 1A:
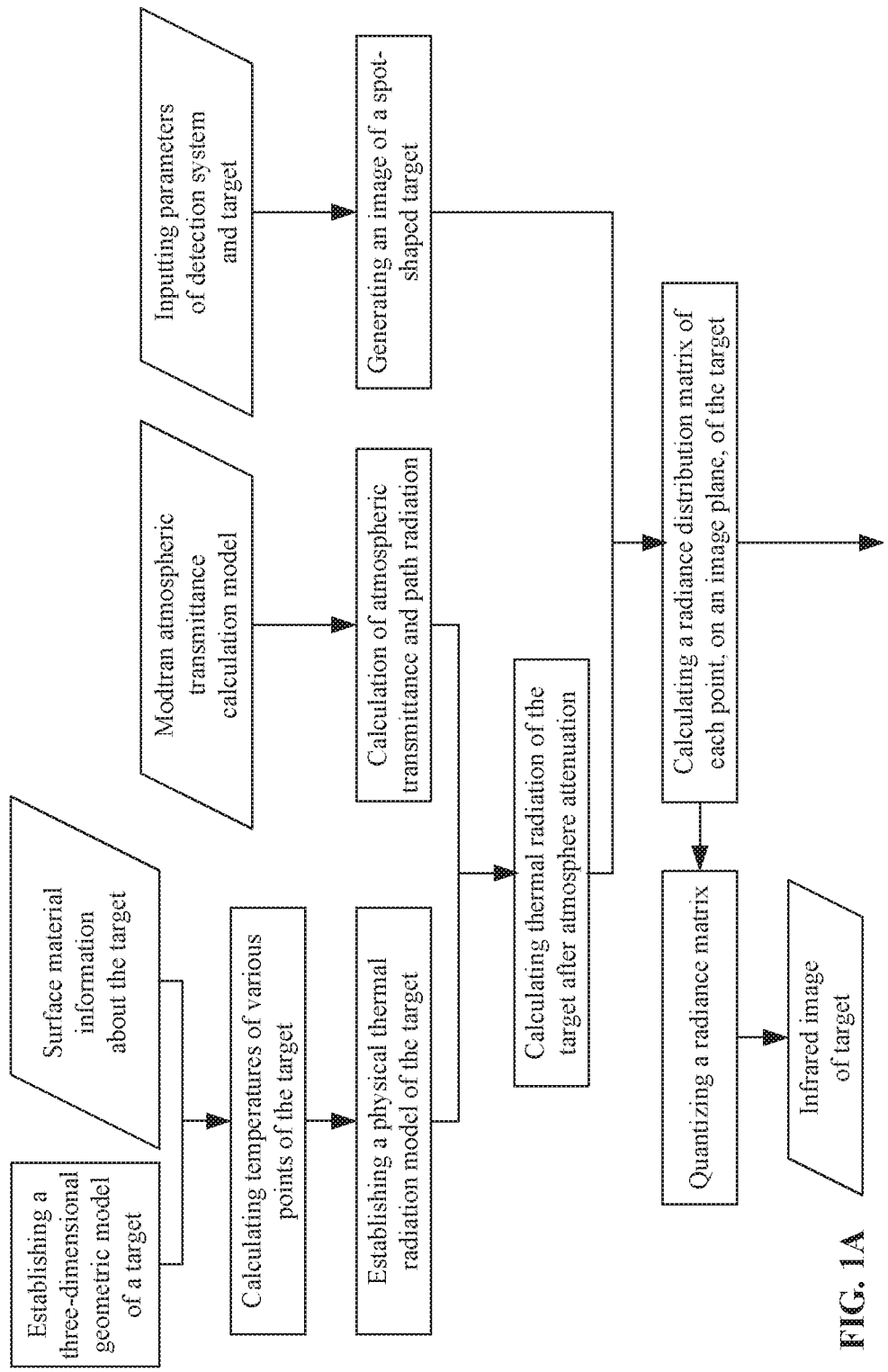
FIGS. 1A-1B are flowcharts of a method of attitude estimation of a spotted target.
Figure 1B:
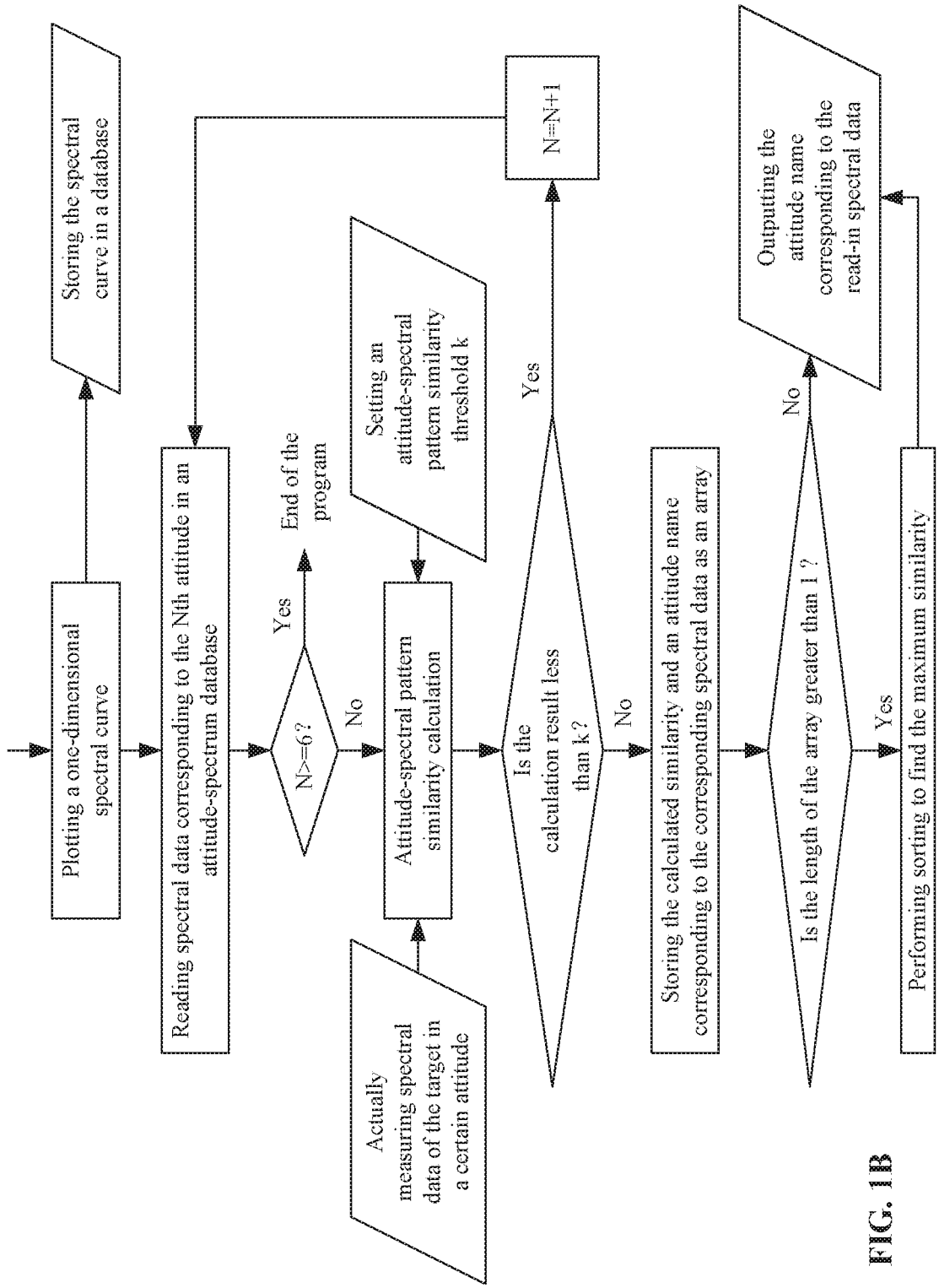

The flowchart of the method of the disclosure is shown in FIGS. 1A-1B, and taking an aircraft as an example, the method comprises:

1. Offline Training (1) Establishing a three-dimensional geometric model of a target, and performing region division according to the structure of the target.

In this example, based on searched size and structure information of a certain type of aircraft, a three-dimensional model of the aircraft is established using 3dsmax software, and different parts of the aircraft are properly distinguished. The aircraft parts mainly comprise: exhaust plume, engine, leading edge of a wing, trailing edge of a wing, nose, cockpit and general parts.

(2) Establishing an object-space temperature distribution model for each region of the target.

An object-space temperature distribution model is established for each region of the target, by means of real-time or simulated measurement, or by employing a fitting method. The disclosure preferably adopts an interpolation fitting method, specifically, based on searched temperature data of the aircraft, performs interpolation fitting processing, for different regions, on the temperature data thereof, so as to obtain approximately a temperature distribution function, which varies with spatial positions, in each region, and then, based on the function obtained by fitting, calculates temperatures of points-of-the-target at other positions in each region.

(3) Establishing an infrared radiation transmission model of an intra-atmospheric target in six attitudes in observation by a detection system.

Figure 5:
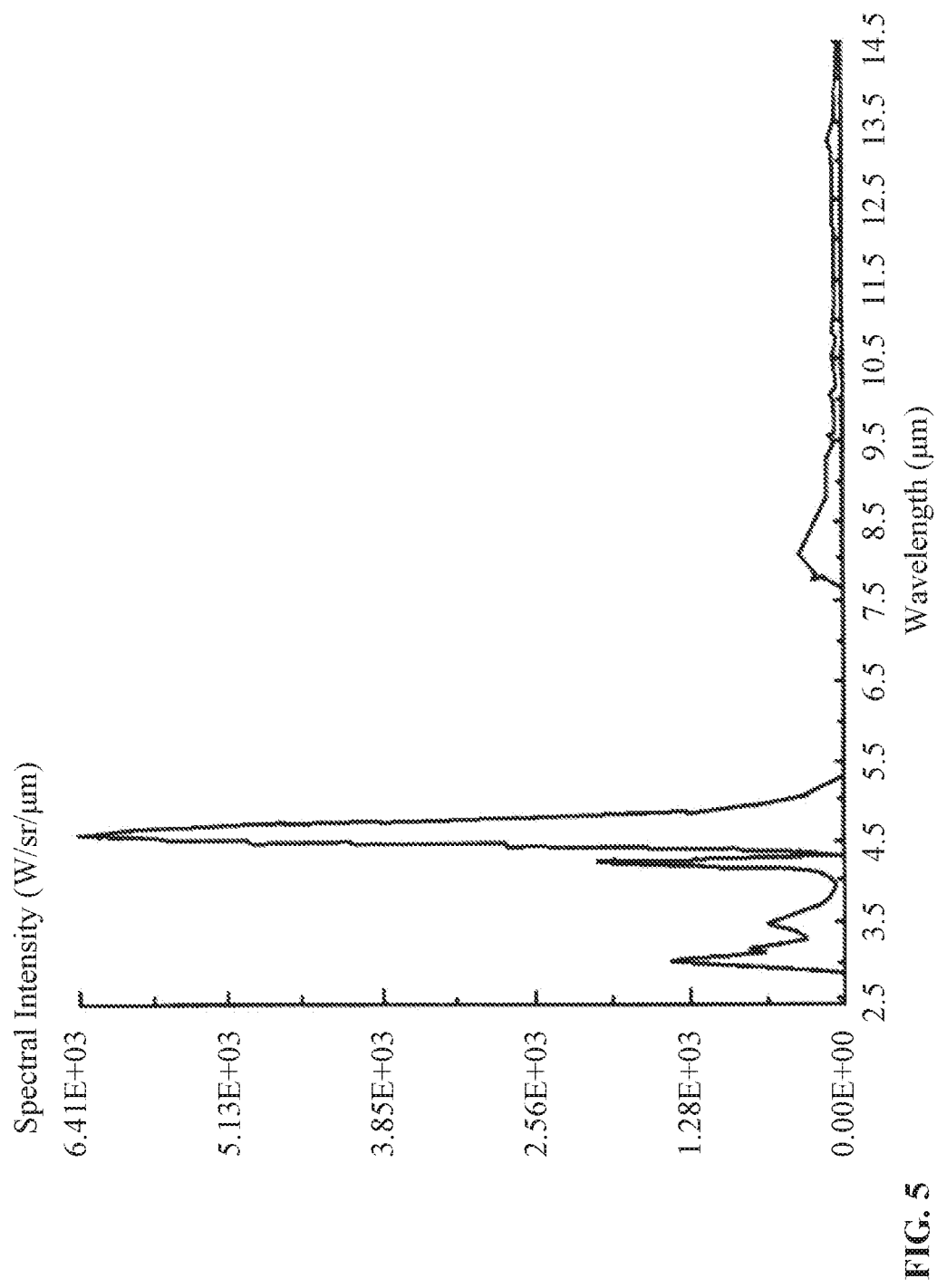
FIG. 5 is a diagram showing radiation spectrum of SU-27 in a certain attitude.

By adjusting the position relationship between the target and the detection system, six attitudes can be formed, comprising: "bottom-view", "top-view", "head-on", "tail-chase", "left-right", and "side". An infrared radiation transmission model of an intra-atmospheric target in six attitudes in observation by a detection system is respectively established, and the establishing process is as follows:

a radiation transmission path of an intra-atmospheric target in observation by an intra-atmospheric detection system, is as shown in FIG. 5: in the figure, the position of the intra-atmospheric detection system is represented by point A, and the position of the intra-atmospheric target observed is represented by point B; radiant energy of the observed target propagates from point B to point A.

Figure 6:
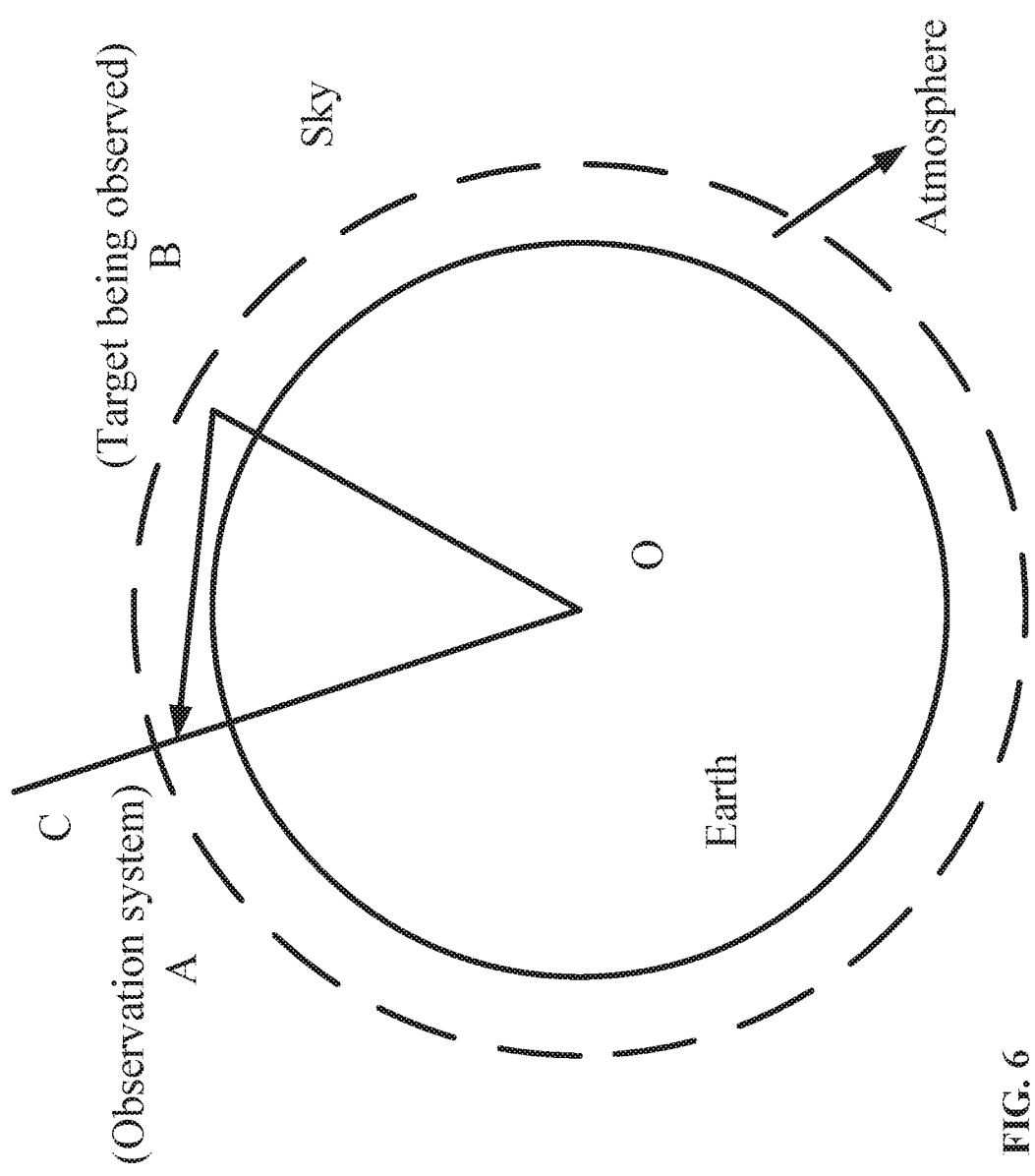
FIG. 6 is a schematic diagram showing relative positional relationships when an intra-atmospheric detection system observes an intra-atmospheric target.

In combination with an atmospheric transmission software, when calculating atmospheric infrared transmittance and path radiation from the intra-atmospheric detection system to the spatial target, input parameters are: height of the detection system, height of the target, the slant distance between the detection system and the target, the highest altitude of the atmosphere, the zenith angle, Earth radius, and infrared waveband. The height of the detection system and the infrared waveband are determined according to actual conditions; the Earth radius is the radius at the latitude of the detection system; the highest altitude of the atmosphere is set to 100 km; the zenith angle is √CAB, as shown in FIG. 6, and its calculation formula is:

$$\angle CAB = 180 - \arccos\left(\frac{\overline{OA}^2 + \overline{AB}^2 - \overline{OB}^2}{2 \cdot \overline{OA} \cdot \overline{AB}}\right)$$

where, $\overline{OA}$, $\overline{OB}$ are respectively the height of the detection system and the height of the target being observed, from the center of Earth; $\overline{AB}$ is a distance between the detection system and the target being observed.

With input of the above parameters, transmittance $\rho_\theta$ and path radiation $L_\theta$ for the target observed at an angle $\theta$ by the intra-atmospheric detection system can be obtained.

For example, through calculation, the following results are obtained: when a detection system with a height of 50 km and positioning directly below ($\theta=0$) detects a spatial target with a height of 10 km and a distance of 40 km therebetween, the calculated transmittance and path radiation at the waveband of 8-12 μm are $\rho_{\theta=0}=0.9977$ and $L_{\theta=0}=0.001905$ (W·m$^{-2}$·sr$^{-1}$).

(4) Using the object-space temperature distribution model and the infrared radiation transmission model to construct an image-space radiant energy model of the target in the six attitudes.

(4.1) Based on the object-space temperature distribution model, constructing an expression $L(T_{(x,y,z)})$ for the object-space radiation characteristic of the target.

In a waveband $\lambda_1 \sim \lambda_2$ and at a temperature $T_{(x,y,z)}$ an equivalent blackbody (emissivity $\varepsilon=1$) radiance $L_b(T_{x, y, z})$ is:

$$L_b(T_{(x,y,z)}) = \int_{\lambda_2}^{\lambda_1} \frac{1.1910 \times 10^8}{\lambda^5} \cdot \frac{1}{e^{\frac{14388}{\lambda T_{(x,y,z)}}} - 1} d\lambda$$

where, $L_b(T_{x, y, z})$—equivalent blackbody infrared radiance ($W \cdot m^{-2} \cdot sr^{-1}$); $\lambda$—wavelength (μm); $T_{(x,y,z)}$—object-space temperature (K) of the target at the position (x,y,z).

Hence, the calculation formula for infrared radiance L(T) of the target surface with the surface temperature of T is:

$$L(T_{(x,y,z)}) = \bar{\varepsilon} \cdot L_b(T_{(x,y,z)}),$$

In the formula:
$L(T_{(x,y,z)})$: infrared ($W \cdot m^{-2} \cdot sr^{-1}$) of the target surface;
$L_b(T_{(x,y,z)})$: blackbody infrared radiance ($W \cdot m^{-2} \cdot sr^{-1}$) at the temperature $T_{(x,y,z)}$;
$\bar{\varepsilon}$: infrared emissivity of the material on the target surface.

(4.2) Based on the expression for the object-space radiation characteristic of the target, and with atmospheric influence taken into account, constructing an expression $L(T_{(x, y,z)}, \theta)$ for the image-space radiation characteristic of the target.

$$L(T_{(x,y,z)}) = \bar{\varepsilon} \cdot L_b(T_{(x,y,z)}) \cdot \rho_\theta + L_\theta.$$

Figure 2:
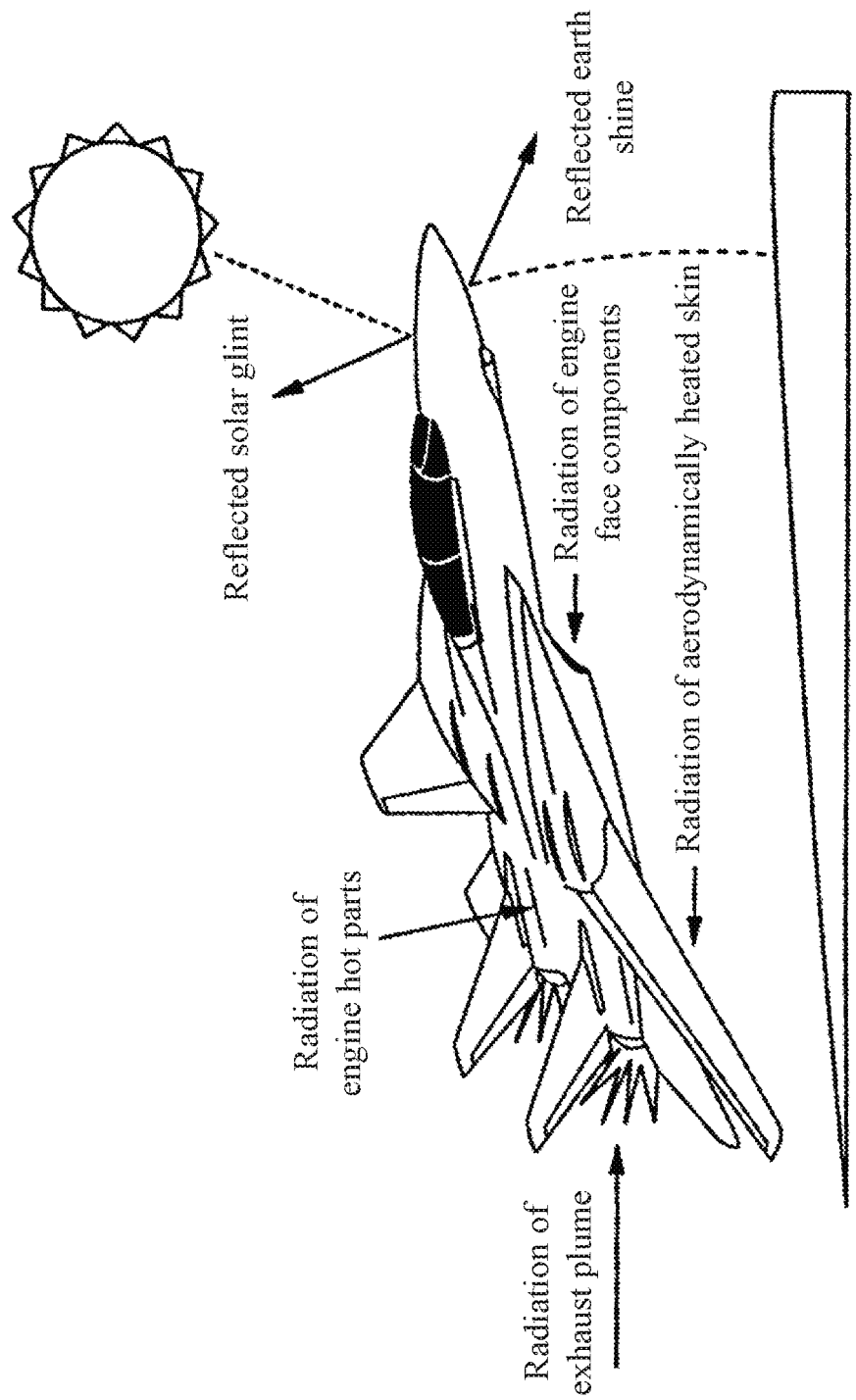
FIG. 2 is a schematic diagram showing compositions of spectrum of an aircraft.
Figure 3:
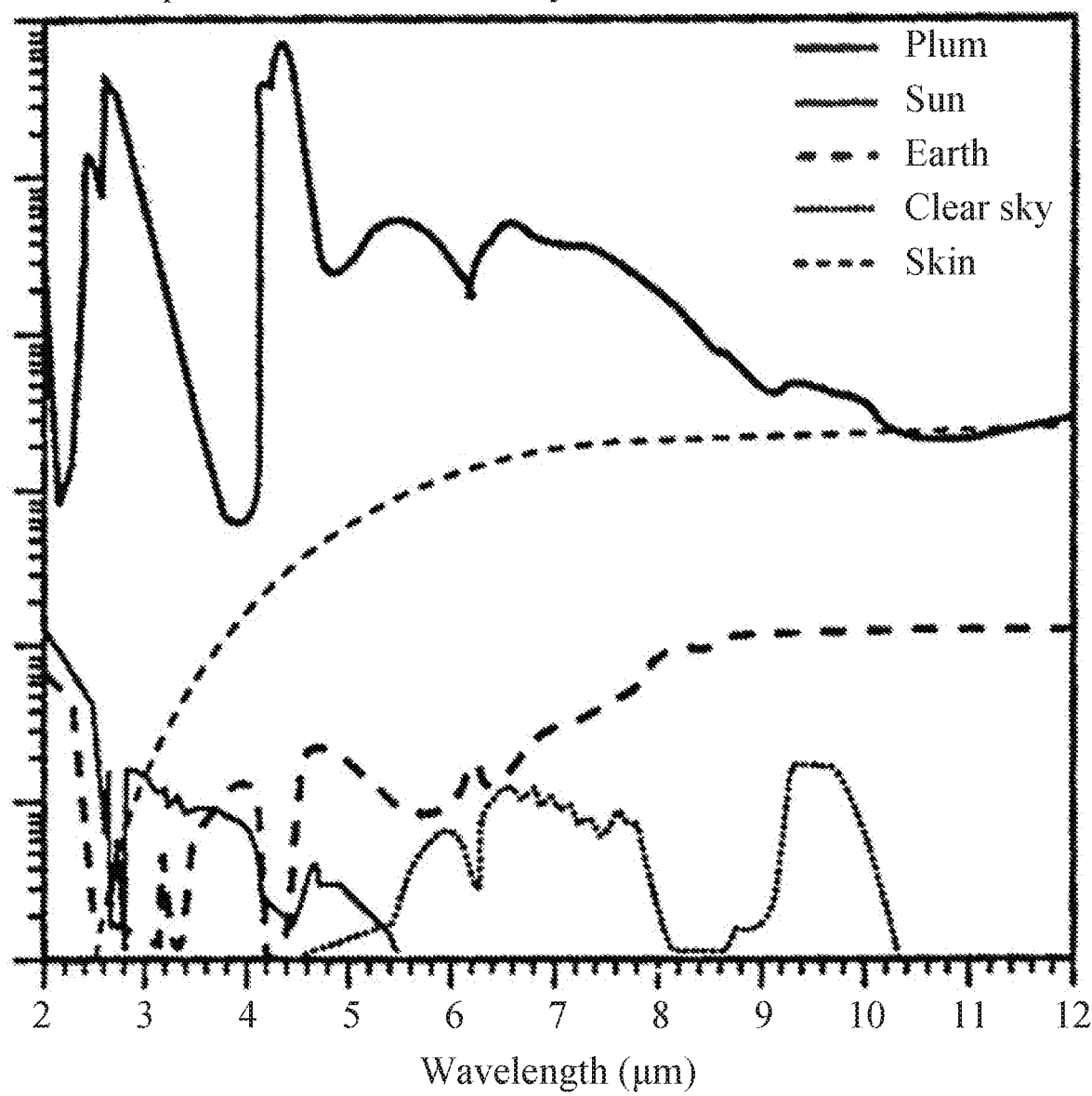
FIG. 3 is a graph showing average spectral characteristics of an aircraft, sky, Earth, and Sun, etc.

In this example of the disclosure, composition of the infrared radiation of the aircraft is as shown in FIGS. 2 and 3, and therefore the radiance of the aircraft skin, the engine, the exhaust plume, and the like are mainly calculated. A specific calculation is as follows:

(a) Engine Radiation Calculation

Taking the emissivity of an exhaust nozzle of the aircraft engine as $\bar{\varepsilon}=0.9$, and based on the formula $L(T_{(x,y,z)}), \theta)$, the radiance at the exhaust nozzle of the engine is calculated.

(b) Aircraft Skin Radiation Calculation

Surface temperature of an aircraft is relevant to a flight speed (Mach number m). Hence, first, $T_{(x,y,z)}$ must be processed with consideration of the speed factor, and then, the radiance at the aircraft skin is calculated by using the formula $L(T_{(x,y,z)}, \theta)$.

For an aircraft in flight with a not-very-high speed (M≤2.5) in the troposphere, the surface temperature of the aircraft $T_{2(x,y,z)}$ is expresses as follows:

$$T_{2(x,y,z)} = T_{(x,y,z)} g\left(1 + k\frac{\gamma - 1}{2}M^2\right)$$

In the formula, $T_{2(x,y,z)}$—surface temperature of the aircraft skin with consideration of speed;
k—coefficient of restitution, which is usually between 0.8-0.94, and for laminar flow, k=0.82;
γ—ratio of constant pressure heat capacity to constant volume heat capacity of air, γ=1.4;
M—speed, i.e., Mach number in flight.

Then, based on the formula $L(T_{2(x,y,z)}, \theta)$, the value of the aircraft skin radiance is calculated, and the aircraft skin emissivity $\bar{\varepsilon}$ is 0.85.

(c) Aircraft Exhaust Plume Radiation Calculation

Taking the emissivity of an exhaust nozzle of the aircraft engine as $\bar{\varepsilon}=0.8$, and then, based on the formula $L(T_{(x,y,z)}, \theta)$, the radiance at the exhaust nozzle of the engine is calculated.

Figure 4:
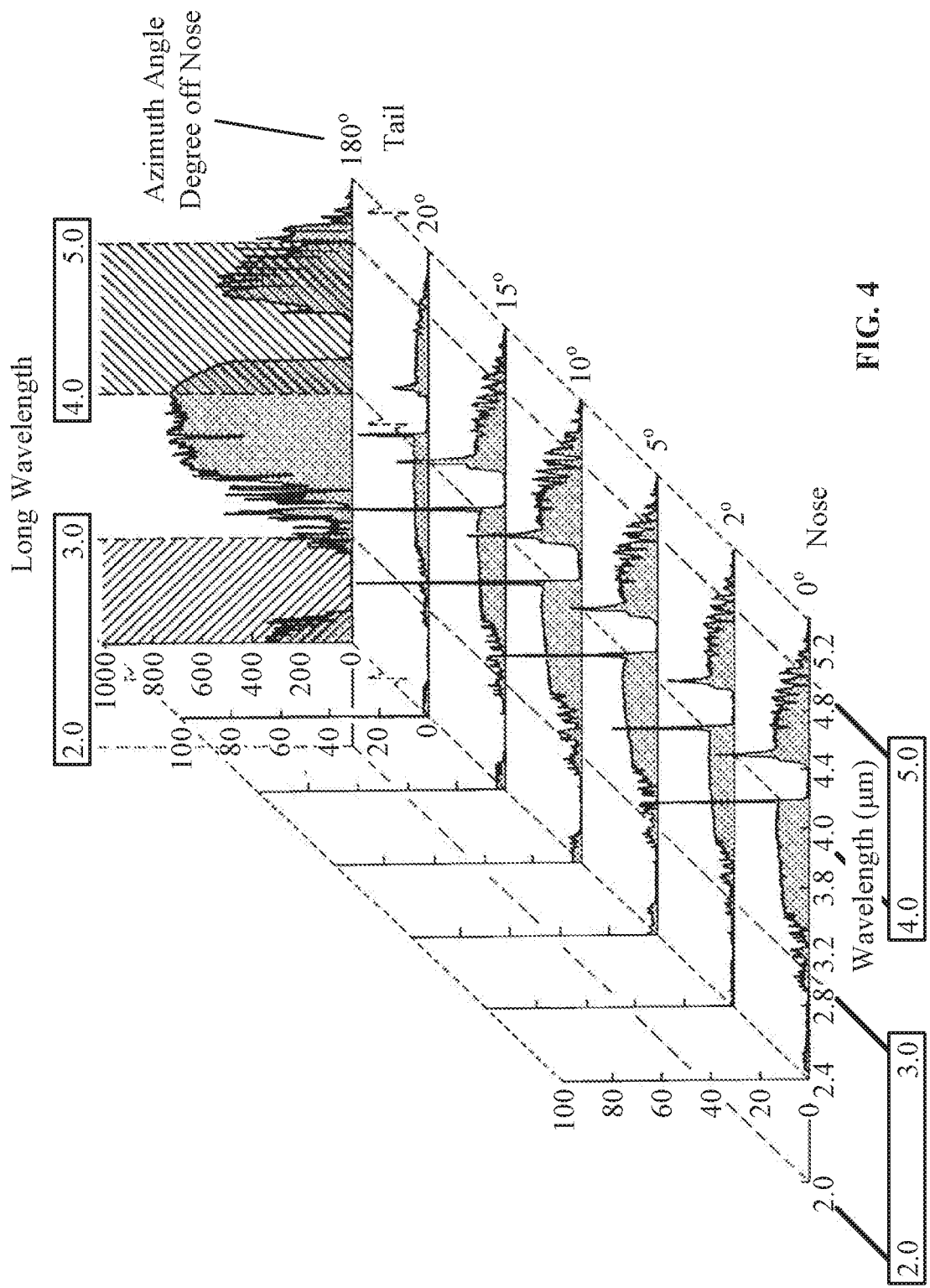
FIG. 4 is a schematic diagram illustrating spectral data of an aircraft at different azimuth angles.

(5) In the six attitudes, based on the image-space radiant energy model of the target, performing simulation calculation to obtain an infrared spectral curve of the spotted target regarding wavelength versus image-space-radiant-energy-of-target, so as to establish a mapping database regarding target-attitude versus spectrum. In this example of the disclosure, part of the data is as shown in FIG. 4.

2. Online Estimation:

(6) Detecting a spotted target

Setting simulation parameters, such as optical properties, spectral resolution and spectral waveband of a detection system, a moving speed and flying height of a moving target, as well as a distance between the detection system and the moving target, etc., and activating detection, thus obtaining images of a spotted target.

(7) Acquiring the image-space radiant energy of the spotted target in real-time, and plotting an infrared spectral curve of the spotted target regarding wavelength versus image-space-radiant-energy-of-target.

Pixel grey-scale information is obtained from the images of the spotted target, and by means of a calibration method, the corresponding image-space radiant energy is obtained, then, based on image-space radiant energy of multi-points, an infrared spectral curve of the spotted target is obtained.

(8) Matching the obtained infrared spectral curve of the spotted target regarding wavelength versus image-space-radiant-energy-of-target within the mapping database regarding target-attitude versus spectrum, to determine the attitude of the target.

First, based on the spectral characteristics in the following typical attitudes, preliminarily determining the attitude of the aircraft and then extracting from the database, a set of spectral curves corresponding to the attitude.

1. A head-on-direction attitude: observation is in a direction from nose to tail of the aircraft; the spectrum of the spotted target formed at this time is dominated by long-wave infrared radiation of the aircraft skin, while other components are less.

2. A side-direction attitude: when the aircraft is symmetrical, the spectrum of the left and right sides are basically consistent; the spectrum of the spotted target formed at this time comprises radiation of the aircraft skin, the exhaust nozzle and the exhaust plume, all the short/medium/long-wave radiation are present, and all components are fully and completely present.

3. A top-view- or bottom-view-direction attitude: observation is in a direction from exact top to bottom or from exact bottom to top of the aircraft; because the observed area of the aircraft skin is the largest all the short/medium/long-waveband radiation are present in the generated spectrum, and the long-wave infrared radiation is the strongest.

4. A tail-chase-direction attitude: observation is in a direction from tail to nose of the aircraft; at this time, the aircraft nose is not observable, and the observed area of the aircraft skin is small; hence, main radiation lies in the exhaust plume and the nozzle, and the short/medium wave is the strongest while the long-wave radiation is the least.

Then, among the set of spectral curves obtained from preliminary determination, performing accurate match for the infrared spectral curve of the spotted target, to determine the attitude of the target.

As shown in FIG. 5, FIG. 5 is an actual measured infrared radiation spectrum of an SU-27 aircraft; by means of qualitative analysis and quantitative calculation of the spectrum, it can be known that, radiation components are present in all of short wave, medium wave and long wave, whereas no radiation is present in the 5.5-7.5 μm medium-long wave; moreover, the medium-wave radiation is the strongest, and the short-wave radiation is the secondly strongest, while the long-wave radiation is the weakest. By matching with the spectral characteristics of typical attitudes in the database, it can be known that, the SU-27 aircraft measured at this time is in a tail-chase-direction attitude, and the mainly observed parts are the exhaust plume and the exhaust nozzle; since the exhaust plume and the exhaust nozzle have relatively high temperature among all points on the surface of the aircraft, this is also consistent with theoretical analysis.

It will be obvious to those skilled in the art that changes and modifications may be made, and therefore, the aim in the appended claims is to cover all such changes and modifications.

What is claimed is:

1. A method, comprising:
   (1) establishing a three-dimensional geometric model of a target, and performing region division according to a structure of the target;
   (2) establishing an object-space temperature distribution model for each region of the target;
   (3) establishing an infrared radiation transmission model of an intra-atmospheric target in six attitudes in observation by a detection system, the six attitudes comprising "bottom-view", "top-view", "head-on", "tail-chase", "left-right", and "side";
   (4) constructing an image-space radiant energy model of the target in the six attitudes using the object-space temperature distribution model and the infrared radiation transmission model;
   (5) in the six attitudes, based on the image-space radiant energy model of the target, performing simulation calculation to obtain an infrared spectral curve of the spotted target regarding wavelength versus image-space-radiant-energy-of-target, so as to establish a mapping database regarding target-attitude versus spectrum;
   (6) detecting the spotted target;
   (7) acquiring the image-space radiant energy of the spotted target in real-time, and plotting an infrared spectral curve of the spotted target regarding wavelength versus image-space-radiant-energy-of-target; and
   (8) matching the infrared spectral curve of the spotted target regarding wavelength versus image-space-radiant-energy-of-target, obtained in (7), within the mapping database regarding target-attitude versus spectrum, to determine the attitude of the target.

2. The method of claim 1, wherein (4) further comprises:
   (4.1) based on the object-space temperature distribution model, constructing an expression $L(T_{(x,y,z)})$ for the object-space radiation characteristic of the target:
   in a waveband $\lambda_1 \sim \lambda_2$ and at a temperature T, an equivalent blackbody radiance $L_b(T_{(x,y,z)})$ is:

$$L_b(T_{(x,y,z)}) = \int_{\lambda_2}^{\lambda_1} \frac{1.1910 \times 10^8}{\lambda^5} \cdot \frac{1}{e^{\frac{14388}{\lambda T_{(x,y,z)}}} - 1} d\lambda,$$

the infrared radiance $L(T_{(x,y,z)})$ of a surface of the target is:

$$L(T_{(x,y,z)}) = \bar{\varepsilon} \cdot L_b(T_{(x,y,z)}),$$

where, $\lambda$ represents wavelength, $T_{(x,y,z)}$ represents an object-space temperature of a target at a position (x,y,z), blackbody emissivity is $\varepsilon=1$, and $\bar{\varepsilon}$ represents infrared emissivity of a material on a surface of the target; and
   (4.2) based on the expression for the object-space radiation characteristic of the target, and with atmospheric influence taken into account, constructing an expression for the image-space radiation characteristic of the target as below:

$$L(T_{(x,y,z)}) = \bar{\varepsilon} \cdot L_b(T_{(x,y,z)}) \cdot \rho_\theta + L_\theta,$$

where, $\rho_\theta$ represents transmittance, $L_\theta$ represents atmospheric path radiation.

3. The method of claim 2, wherein the target is an aircraft, and radiance of the aircraft is divided into three parts to be calculated respectively: aircraft skin, engine, and exhaust plume.

4. The method of claim 3, wherein when calculating the radiance of the aircraft skin, first, the object-space temperature $T_{(x,y,z)}$ of the target at a position (x,y,z) is processed, to obtain an object-space temperature of the target with a speed taken into account:

$$T_{2(x,y,z)} = T_{(x,y,z)} g \left(1 + k \frac{\gamma - 1}{2} M^2\right),$$

where, k represents a coefficient of restitution, $\gamma$ represents a ratio of constant pressure heat capacity to constant volume heat capacity of air, and M represents a speed.

5. The method of claim 1, wherein (8) comprises:
   based on the infrared spectral curve of the spotted target regarding wavelength versus image-space-radiant-energy-of-target, obtained in (7), preliminarily determining the attitude of the aircraft, and extracting a set of spectral curves corresponding to the attitude, from the mapping database; and
   performing accurate match in the set of spectral curves, to determine the attitude of the target.

6. The method of claim 1, wherein the target is an aircraft, and the infrared spectral curve of the spotted target regarding wavelength versus image-space-radiant-energy-of-target, obtained in (7), is analyzed as follows:
   if long-wave infrared radiation is dominant, then preliminarily determining the attitude as "head-on";
   if all of short/medium/long-wave radiation is present, then preliminarily determining the attitude as "side";
   if all of short/medium/long-wave radiation is present, and long-wave infrared radiation is strongest, then preliminarily determining the attitude as "top-view" or "bottom-view"; and
   if short/medium-wave radiation is strongest, and long-wave radiation is weakest, then preliminarily determining the attitude as "tail-chase".

7. A system, comprising:
   a three-dimensional-model establishing module, which is adapted to establish a three-dimensional geometric model of the target, and perform region division according to the structure of the target;
   an object-space-temperature-distribution-model establishing module, which is adapted to establish an object-space temperature distribution model for each region of the target;
   an infrared-radiation-transmission-model establishing module, which is adapted to establish an infrared radiation transmission model of an intra-atmospheric target in six attitudes in observation by a detection system; the six attitudes comprise "bottom-view", "top-view", "head-on", "tail-chase", "left-right", and "side";
   an image-space-radiant-energy-model establishing module, which is adapted to use the object-space temperature distribution model and the infrared radiation transmission model to construct an image-space radiant energy model of the target in the six attitudes;

a mapping-database establishing module, which is adapted to, in the six attitudes, based on the image-space radiant energy model of the target, perform simulation calculation to obtain an infrared spectral curve of the spotted target regarding wavelength versus image-space-radiant-energy-of-target, so as to establish a mapping database regarding target-attitude versus spectrum;

a detection module, which is adapted to detect a spotted target;

an infrared-spectral-curve-of-spot-shaped-target generation module, which is adapted to acquire the image-space radiant energy of the spotted target in real-time, and plot an infrared spectral curve of the spotted target regarding wavelength versus image-space-radiant-energy-of-target; and an attitude estimation module, which is adapted to match the generated infrared spectral curve of the spotted target regarding wavelength versus image-space-radiant-energy-of-target, within the mapping database regarding target-attitude versus spectrum, to determine the attitude of the target.

8. The system of claim 7, wherein the image-space-radiant-energy-model establishing module comprises:

an expression-for-object-space-radiation-characteristic-of-target constructing submodule, which is adapted to, based on the object-space temperature distribution model, construct an expression $L(T_{(x,y,z)})$ for the object-space radiation characteristic of the target:

in a waveband $\lambda_1 \sim \lambda_2$ and at a temperature T, an equivalent blackbody radiance $L_b(T_{(x,y,z)})$ is:

$$L_b(T_{(x,y,z)}) = \int_{\lambda_2}^{\lambda_1} \frac{1.1910 \times 10^8}{\lambda^5} \cdot \frac{1}{e^{\frac{14388}{\lambda T_{(x,y,z)}}} - 1} d\lambda,$$

the infrared radiance $L(T_{(x,y,z)})$ of a surface of the target is:

$$L(T_{(x,y,z)}) = \bar{\varepsilon} \cdot L_b(T_{(x,y,z)}),$$

where, $\lambda$ represents wavelength, $T_{(x,y,z)}$ represents an object-space temperature of a target at a position (x,y,z), blackbody emissivity is $\varepsilon=1$, and $\bar{\varepsilon}$ represents infrared emissivity of a material on a surface of the target;

an expression-for-the-image-space-radiation-characteristic-of-target constructing submodule, which is adapted to, based on the expression for the object-space radiation characteristic of the target, and with atmospheric influence taken into account, construct an expression for the image-space radiation characteristic of the target as below:

$$L(T_{(x,y,z)}) = \bar{\varepsilon} \cdot L_b(T_{(x,y,z)}) \cdot \rho_\theta + L_\theta,$$

where, $\rho_\theta$ represents transmittance, $L_\theta$ represents atmospheric path radiation.

9. The system of claim 7, wherein the attitude estimation module comprises:

a preliminary determination submodule, which is adapted to, based on the generated infrared spectral curve of the spotted target regarding wavelength versus image-space-radiant-energy-of-target, preliminarily determine the attitude of an aircraft, and extract a set of spectral curves corresponding to the attitude, from the mapping database; and an accurate match submodule, which is adapted to perform accurate match in the set of spectral curves, to determine the attitude of the target.

\* \* \* \* \*